Feb. 16, 1926.
C. P. McDARMENT
SOUNDING DEVICE
Filed Sept. 23, 1922
1,573,261
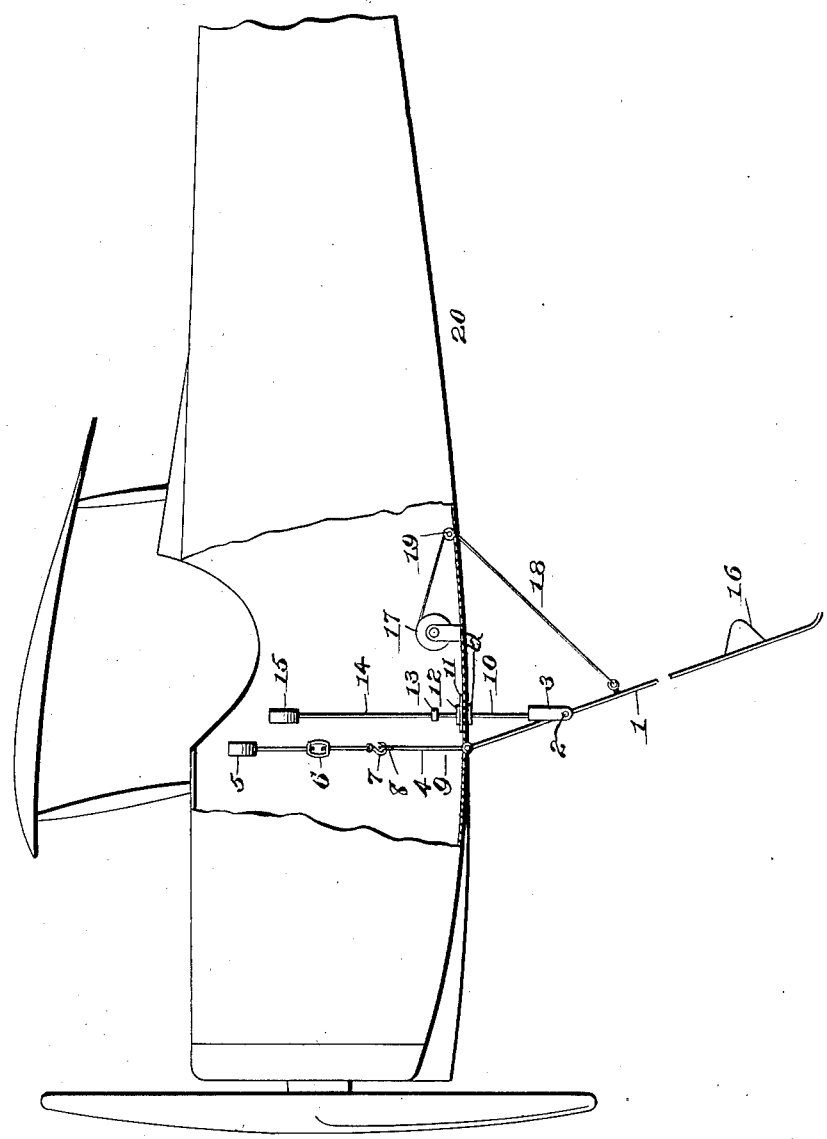
Inventor
Corley P. McDarment
By Robert H. Young
Atty.

Patented Feb. 16, 1926.

1,573,261

UNITED STATES PATENT OFFICE.

CORLEY P. McDARMENT, OF MAYFIELD, KENTUCKY.

SOUNDING DEVICE.

Application filed September 23, 1922. Serial No. 590,071.

*To all whom it may concern:*

Be it known that I, CORLEY P. McDARMENT, a citizen of the United States, residing at Mayfield, in the county of Graves and State of Kentucky, have invented certain new and useful Improvements in a Sounding Device, of which the following is a specification.

My invention relates to a sounding device, for aircraft. The object of my invention is to produce a device, or apparatus, which will indicate the proximity of the aircraft, in connection with which it is used, to the ground or landing surface when the aircraft approaches such landing surface very closely, the apparatus indicating also the direction of side drift of the aircraft in relation to the landing surface.

The device is intended to facilitate and render safer the landing of aircraft, both during the day and night and particularly in dark or foggy weather, the device being also useful in the instruction of students, enabling them to land an aircraft and particularly an airplane with greater precision and safety.

A further object of the invention is to provide a device of the character referred to, a portion of which is housed within the fuselage or body of the craft and a portion of which projects or depends therefrom or from some other nether part of the craft, the projecting portion of the apparatus being foldable so that it may lie close to the fuselage or body and eliminate to a great extent head resistance. Means are provided within reach of the operator for folding such projecting part of the apparatus and permitting the same to resume its operative position.

With the above and other objects in view the invention consists in the novel construction, combination and arrangement herein fully described, illustrated and claimed.

The accompanying drawing is a side elevation of the fuselage or body of an airplane, the same being partly broken away to better illustrate the sounding device in its applied relation thereto, the trailer arm being shown in its operative position in full lines and being shown in its folded position in dotted lines.

Referring to the drawing in detail, the device or apparatus comprises essentially a trailer arm 1 which is shown as mounted under and connected with the fuselage 20. The trailer arm when in its operative position inclines rearwardly from top to bottom, as shown in the drawing, and has its lower extremity turned rearwardly so as not to catch in the ground. The trailer arm 1 is connected adjacent to the upper end thereof by means of a pivot 2 to a fork 3 fast on the lower end of a normally vertical shaft 10 which extends upwardly through the bottom of the fuselage and is journaled for axial movement in a bearing 11. The shaft 10, above the bearing 11, has a stop collar 12, which rests on the bearing 11, and a similar stop collar which lies beneath and against bearing 11. The shaft 10 extends slightly above the stop collar 12 and is connected by a union 13 to an extension 14 on the shaft 10, the extension 14 being preferably of smaller diameter.

The shaft extension 14 enters the casing 15 of a side drift indicator containing a suitable dial or pointer which is operated by the turning movement of the shaft 10 to indicate side drift of the aircraft when the lower extremity of the trailer arm is moved laterally by dragging along the landing surface.

The upper extremity of the trailer arm 1 is attached to the lower extremity of a flexible cable 4 which passes through one or more guides 9 within the fuselage 20. The upper end of the cable 4 enters the casing 5 of an altitude indicator containing a suitable dial or indicator and controlled by said cable. A turn-buckle 6 between the ends of the cable 4 provides for adjusting the length of said cable. The cable is again divided and provided with a hook 7 which is insertable in and removable from an eye or ring on the adjacent section of the cable. This allows the cable to be slacked in order to facilitate folding of the trailer arm upwardly against the arm of the fuselage and also to relieve tension on the spring and mechanism of the altitude indicator within the casing 5, when the device is not in use.

Extending rearwardly from the trailer arm 1 is a wind vane 16 which is arranged in the air stream before the trailer arm comes in contact with the ground. When in flight, the trailer arm is swung to one side or the other in case of slide-slipping of the machine by the action of the air against the vane 16.

To move the trailer arm 1 from its operative position to its folded position and vice versa, I employ a cable 18, one extremity of which is attached to the trailer arm 1, as shown, and the other end of which is attached to a winding drum 17 within reach of the operator, the cable 18 passing around one or more guide pulleys 19. Any suitable means may be employed for locking the drum 17 in order to hold the trailer arm folded upwardly against the bottom of the fuselage.

From the foregoing description taken in connection with the accompanying drawing, it will be understood that when the aircraft closely approaches the landing surface, the trailer arm 1 comes in contact therewith and the lower free end thereof is elevated thereby depressing the upper end thereof and pulling downwardly on the cable 4, the amount of deflection of the trailer arm being noted by the indicator 5. In case the aircraft is drifting to one side or the other, the lower extremity of the trailer arm is moved in the opposite direction, thereby turning the shaft 10 and the extension shaft 14 and operating the side drift indicator 15. It will be apparent that the indicator 15 for indicating side motion or undesired drift of the aircraft is actuated by the contact of the trailer with the ground. By reason of the manner of mounting of the trailer 16 in the fork 3, which is integral with the rotatable shaft 10 and its integral extension 14, a side thrust on the trailer causes the same to be moved laterally in such a manner as to describe an arc. Obviously this causes a rotation of the shaft 10 and its extension 14 for the purpose of actuating the side drift indicator 15. The arcuate movement of the upper end of the trailer 16 which is connected to the cable 4, causes a pull to be exerted on the cable 4 and a consequent partial withdrawal thereof from the fuselage of the aircraft. This causes the altitude indicator 5 to be actuated as well as the side drift indicator 15 by reason of the arcuate lateral movement of the trailer. However, this double indication is not confusing but moreover is advantageous in that it is effective in notifying the pilot of his proximity to the ground. Obviously in case there is no side drift, the indicator 5 alone is actuated. It may be noted at this point that electric lamps may be substituted for the indicator 5 and 15 which will facilitate operation in foggy weather or at night time. Furthermore, in case of side slipping of the machine, either by day or by night, the air will act against the vane 16 and indicate side drift through the device 15.

What I claim is—

1. In combination with an aircraft, a sounding device carried thereby and adapted by contact with the landing surface to indicate the proximity of the aircraft to such surface, said device embodying a trailer arm mounted under the body of the aircraft and adapted to swing in a fore and aft direction and also arcuately laterally.

2. In combination with an aircraft, a rigid sounding device pivotally carried thereby in such a manner as to permit motion of said device arcuately laterally of said aircraft, and adapted by contact with the landing surface to be moved longitudinally of said aircraft to indicate the proximity of the aircraft to such surface, said device being also adapted through the arcuate lateral motion thereof to indicate the side drift of said aircraft.

3. In combination with an aircraft, a sounding device carried thereby and adapted by contact with the landing surface to indicate the proximity of the aircraft to such surface, said device embodying a trailer arm mounted under the body of the aircraft and adapted to swing in a fore and aft direction and also arcuately laterally, and a vane on said sounding device parallel to the longitudinal axis of said aircraft.

4. In combination with an aircraft, a sounding device pivotally carried thereby in such a manner as to permit motion of said device both longitudinally and arcuately laterally of said aircraft, and adapted by contact with the landing surface to indicate the proximity of the aircraft to such surface said device embodying a movable trailer arm mounted under the aircraft, indicating means for noting variations in the position of said arm, and a vane on said arm parallel to the longitudinal axis of said aircraft.

5. In combination with an aircraft, an indicating device carried thereby and comprising a depending member pivotally carried by said aircraft and provided with a wind vane, the depending member being movable arcuately laterally of said aircraft to indicate side slip while in flight.

In testimony whereof I have affixed my signature.

CORLEY P. McDARMENT.